UNITED STATES PATENT OFFICE.

ALFRED O. BLAICH, OF CHICAGO, ILLINOIS, ASSIGNOR TO ALFRED O. BLAICH COMPANY, OF CHICAGO, ILLINOIS, A CORPORATION OF ILLINOIS.

CASE-HARDENING MATERIAL AND PROCESS OF MAKING SAME.

1,241,909.

Specification of Letters Patent.    Patented Oct. 2, 1917.

No Drawing.    Application filed January 29, 1917. Serial No. 145,141.

*To all whom it may concern:*

Be it known that I, ALFRED O. BLAICH, a citizen of the United States, residing at Chicago, in the county of Cook and State of Illinois, have invented new and useful Improvements in Case-Hardening Materials and Processes of Making Same, of which the following is a specification.

The purpose of this invention is to provide an improved process for making case hardening compounds of substantially dry granular form. It consists in the employment of the materials mentioned and their combination by the steps stated, as indicated in the claims.

The product which is to be produced by the process which constitutes this invention is to be distinguished from any plastic or pasty mixture, and also from any dry mixture in which the dry elements are merely mechanically interspersed, the importance of the distinction is that in the product to be produced by this process, each granule of the carbonaceous material to be employed has associated with it, either by impregnation or adhesion, the desired quantity of energizing material, so that however separated the granules may become in the case hardening process, each granule is efficient wherever it may be found in contact with the metal to be hardened.

In making the case hardening material which it is the purpose of this process to produce, I employ carbonaceous material, preferably charcoal or coke, ground to the condition of very fine gravel. A quantity of this granular material is forcibly held in a solution of hot water and about 15% soda ash for a period of several hours, usually about four hours' intermission. The carbon naturally tends to rise to the surface of the liquid solution, but it should be held forcibly submerged, as by a screen or cloth holding it below the surface of the liquid solution, or by being inclosed in bags which are held submerged. After a sufficient period of submersion in the hot soda ash solution to cause the granules to be thoroughly impregnated with that solution, they are removed therefrom and dried in any convenient way, as by revolving them in a heated drum. The temperature for this purpose need not exceed 300° F. A lower temperature will suffice by giving a longer time to the process, and a higher temperature may be employed for hastening it. When the granules are thoroughly dried, leaving them impregnated with the soda ash but with a minimum of moisture, the mass is spread out and sprayed with oil to a sufficient extent to grease the surface of each granule, the mass being stirred sufficiently to cause the oil to come in contact with all the granules, and the quantity of oil being not sufficient to leave any excess of oil beyond what will smear the surface or be partly absorbed into the porous granules. After thus greasing the carbonaceous granules, the entire mass is mixed with a quantity of pulverized calcium carbonate or barium carbonate by stirring the two dry elements together, the quantity of the pulverized carbonate being only sufficient to coat the oiled surfaces of the carbonaceous granules without leaving any excess of the pulverized carbonate free in the mass of the mixture.

It will be understood that function of the soda ash is as an energizer to cause the carbonaceous material to become active in the case hardening process, and that the same function pertains to the calcium carbonate or barium carbonate added in the final step of the process; but advantage is found in employing two separate energizers, one with which the carbonaceous granules are impregnated, and the other with which they are coated.

The advantage of employing two separate energizers, one of which is incorporated with the carbon granules by impregnation, and the other of which is exteriorly applied to said granules, has been definitely ascertained by experimental use. The reason for the advantage observed is probably that the energizing effect of the superficial energizer is more quickly obtained by reason of its being superficially applied, and that the continuation of the energizing effect throughout the entire period of reduction of the carbonaceous granules to the condition for carbonizing the metal which is to be case hardened, is insured by the impregnation of the granules with the energizer which is first incorporated with the granules in this way, and which by reason of being thus incorporated instead of being on the surface, is held in abeyance for its energizing effect during the earlier part of the case hardening process, while the superficial energizer is performing its function. This explanation of the advantage actually observed is, of course, only inferential; but on the basis of this inferential explanation, it seems preferable to employ for the energizer with which the granules are impregnated, a material not too easily volatilized or liquefied, but which will remain incorporated in the granules up to a comparatively high temperature; and soda ash is a suitable substance to employ for this impregnated energizer on this account.

I claim:—

1. The process of making case-hardening material which comprises the following steps; first, impregnating carbon granules with an energizer by saturating the granules with a liquid solution of such energizer, and drying them at a temperature lower than will affect the energizer otherwise than by driving off the moisture; second, applying a surfacing of oil to the impregnated granules; finally, mechanically mixing the oil-surfaced granules with a pulverulent energizer.

2. The process of making case-hardening material which comprises the following steps; first, impregnating carbon granules with an energizer by saturating the granules with a liquid solution of such energizer; next, removing the granules from the liquid solution and driving off the moisture by a temperature lower than will affect the energizing material otherwise than by separating the moisture; next, spraying the impregnated and dried granules with oil for surfacing them therewith; finally, mechanically mixing the oil surfaced granules with a powdered energizer.

3. The process of making case-hardening material which comprises the following steps; first, impregnating carbon granules with soda ash by saturating the granules with a hot liquid solution of soda ash and drying them at a temperature which will not affect the soda ash otherwise than by separating the moisture; next, surfacing the soda-ash-impregnated and dried granules with oil, and, finally, mechanically mixing the oil surfaced granules with pulverized calcium or barium carbonate.

4. A case hardening material consisting of carbonaceous granules, each of which is impregnated with an energizer and superficially coated with a pulverulent energizer.

5. A case hardening material consisting of carbonaceous granules, each of which is impregnated with an energizer and superficially coated with oil and a different energizer.

In testimony whereof I have hereunto set my hand at Chicago, Illinois, this 27th day of January, 1917.

ALFRED O. BLAICH.

Copies of this patent may be obtained for five cents each, by addressing the "Commissioner of Patents, Washington, D. C."